United States Patent
Campobasso et al.

(10) Patent No.: US 12,430,596 B2
(45) Date of Patent: Sep. 30, 2025

(54) FLEET OPTIMIZER

(71) Applicant: OneSky Flight LLC, Richmond Heights, OH (US)

(72) Inventors: Michael Campobasso, Richmond Heights, OH (US); Oleksandr Hendrik, Richmond Heights, OH (US); Hunter Gardner, Richmond Heights, OH (US); Benigno Pablo Digon, IV, Richmond Heights, OH (US); Zackary James Hagerty-Posell, Richmond Heights, OH (US); Durga Nagalla, Richmond Heights, OH (US)

(73) Assignee: OneSky Flight LLC, Richmond Heights, OH (US)

( * ) Notice: Subject to any disclaimer, the term of this patent is extended or adjusted under 35 U.S.C. 154(b) by 112 days.

(21) Appl. No.: 18/543,787

(22) Filed: Dec. 18, 2023

(65) Prior Publication Data

US 2024/0211834 A1   Jun. 27, 2024

Related U.S. Application Data

(60) Provisional application No. 63/434,869, filed on Dec. 22, 2022.

(51) Int. Cl.
   *G06Q 10/0631* (2023.01)
   *G06Q 50/40* (2024.01)

(52) U.S. Cl.
   CPC .......... *G06Q 10/06312* (2013.01); *G06Q 10/063116* (2013.01); *G06Q 50/40* (2024.01)

(58) Field of Classification Search
   CPC .......... G06Q 10/06312; G06Q 50/40; G06Q 10/063116
   (Continued)

(56) References Cited

U.S. PATENT DOCUMENTS

| | | |
|---|---|---|
| 2003/0191678 A1 | 10/2003 | Shetty et al. |
| 2015/0019065 A1* | 1/2015 | Bollapragada ............ B64F 5/40 701/29.1 |

(Continued)

OTHER PUBLICATIONS

"Increasing stability of crew and aircraft schedules" Published by Elsevier (Year: 2012).*
(Continued)

*Primary Examiner* — Zeina Elchanti
(74) *Attorney, Agent, or Firm* — Foley & Lardner LLP

(57) ABSTRACT

Embodiments herein describe how a computer can receive scheduling requests for various user types. The computer can iteratively allocate the aircraft to determine a schedule for each aircraft based on the requests and determining an availability for crews associated with the aircraft. The computer can iteratively execute the algorithm for each updated scheduling request. The computer can generate schedule change sets for a graphical user interface based on an allocation of the aircraft and crews from the algorithm. Generating the schedule change sets can include determining a viability of the plurality of change sets; determining a cost associated with each of the viable schedule change sets according to a predetermined cost function; and selecting a change set based on the cost thereof. The computer can automatically generate and transmit the change set to schedule propagation nodes.

20 Claims, 4 Drawing Sheets

(58) Field of Classification Search
USPC .............................................. 705/6
See application file for complete search history.

(56) References Cited

U.S. PATENT DOCUMENTS

2015/0221225 A1    8/2015  Petersen et al.
2016/0335567 A1*  11/2016  Petersen .......... G06Q 10/06312
2018/0137766 A1*   5/2018  Bostick .................. G08G 5/727

OTHER PUBLICATIONS

Extended European Search Report on EPO App. 23219335.9 dated Mar. 12, 2024 (7 pages).
EPO Examination Report for Application No. 23219335.9 mailing date Jul. 21, 2025, 5 pages.

* cited by examiner

FLEET OPTIMIZER

CROSS-REFERENCE TO RELATED APPLICATIONS

This application claims the benefit of and priority to U.S. Patent Application No. 63/434,869, filed on Dec. 22, 2022, the contents of which are incorporated herein by reference in their entirety.

TECHNICAL FIELD

This application relates generally to methods and systems scheduling resources for transportation services.

BACKGROUND

Transportation infrastructure can include numerous locations that a passenger can depart from, and many destinations that a passenger can travel to. Moreover, the passengers can, via a client device, provide an indication of their intended origin and destination to a scheduler. Adjustments to schedules based on such requests can include errors or omissions which may degrade subsequent operations or efficiencies. For example, aircraft can remain grounded for lack of passengers, maintenance, crews, or so forth. Establishment and management of dynamic vehicle schedules can be challenging because of a number of factors that are considered, and the potential impacts of any changes, particularly when a potential solution space includes various combinations of passengers, crews, vehicles, infrastructure, and so forth. Such difficulties can compound wherein selective accommodation of passengers can increase efficiency, particularly so when the passengers comprise multiple priority types, and a higher priority scheduling request is received later than a lower priority scheduling request.

Further, such dynamic scheduling can depend on the receipt of requests from or associated with various locations, sub-fleets, management tools, or other nodes, and a provision of schedules to the same. For example, an update to a destination for a crew of an aircraft can be communicated to the crew, a destination of the aircraft, an origin of the aircraft, etc., where an omission of propagating the change to any portion of the network can inhibit planned flight operations. Various dependencies or other linkages between the various aspects of the dynamic schedule may exist, but may not be immediately apparent to a user. For example, a small change to a flight might cause a pilot to become available for a subsequent flight, due to flight hour limitations, which can cause issues in the days or even weeks after a change is implements. A scheduler can select one portion of a change set that causes a rule violation, or may select a higher cost option because of concern over a potential rule violation which is not applicable to a change. That is, a failure to provide a display of linkages or dependencies according to atomic change sets in dynamic scheduling, as is provided henceforth, inhibits timely and accurate propagation of scheduling adjustments to various nodes associated with their implementation. Improvements to the art of organization, linkages, and display of changes for dynamic vehicle schedulers are desired.

SUMMARY

Developments in electronic devices and communication have allowed ease of reserving transportation services (e.g., aircraft charters, airline carriers, rental cars, for-hire drivers, mass transit). For example, a user may search for a flight leaving on a selected departure date through a client device. The client device may query a booking system of the travel provider or issue a query to a scheduling circuit operated by a travel service provider or a travel agency for available flights on the selected departure date and receive a list of available flights or carriers for the selected departure date in return. Various users may subscribe to various services, or otherwise be associated with varying redemption policies. For example, a client may have an account associated with a vehicle type (e.g., a vehicle size, speed, amenity, or the like). A client may have an account associated with a level of service. For example, a client may arrange guaranteed transportation within a minimum time (e.g., 12 hours, 24 hours, or a week), or may arrange transportation on a best effort basis (e.g., according to a capacity available in a network).

A travel service provider may schedule aircraft according to a service offered. For example, an aircraft requiring one week notice may schedule an itinerary at least a week in advance. If another traveler requests a similar itinerary, the passenger may be accommodated according to the capacity of the currently scheduled aircraft. Although some aircraft may be operated according to a service or customer type, such operation may not be sufficient to fill empty seats and lead to inefficient usage of transportation resources including vehicles, crews, or infrastructure.

Existing travel industry systems may determine scheduling in an advance basis, or may optimize schedules based on historical metrics that may not correspond to future demand or current scheduling requests from users. Moreover, existing systems may operate on a predefined fleet whereas in practice, a system may include variable size fleets (e.g., an optimal schedule may include an addition of aircraft, crews, or the like, or a use of a subset of a fleet). Depending on the travel demands for vehicles or routes, a scheduler may vary a number of vehicles, routes, times thereof, crewing, or the like. A problem with the prior systems arises in circumstances where the travel service includes various fleets, various customer types, or various booking schedules. For example, one fleet may include wholly or fractionally owned vehicles that may be reserved within days or hours of travel. Another fleet which may include pre-contracted vehicles reserved by an hourly credit system (which may be referred to as a jet card). Yet another fleet may include aircraft that are not yet under contract, but which may be reserved according to future demand according to scheduling requests of certain members or other users who may reserve vehicles on a trip-to-trip basis. Current systems may not schedule the various customer types according to the various fleet types, or booking requirements or customs of the various users.

In these circumstances, vehicles often need to be repositioned or travel some distance between servicing travelers. A proportion of time, miles, or another metric of use on a vehicles or seats basis may determine a utilization of the aircraft. A utilization may be associated with a cost, or another cost estimate may be defined (e.g., according to engine hours, fuel use, or other information associated with a route). The difference in service (e.g., legroom, flight time, how new is the vehicle, number of seats, other amenities) between vehicles may vary greatly between fleets and customers. However, various fleets may include aircraft of types which may include overlapping types such that an aircraft for a first fleet may be employed for a customer of a second fleet. The systems and methods disclosed herein may be employed to schedule the various customers between the various fleets.

Embodiments disclosed herein may address shortcomings in the art and may provide additional or alternative improvements or benefits. The embodiments include systems and methods of scheduling various customers on various aircraft fleets, such as according to a cascading reservation system wherein the scheduler iteratively schedules aircraft according to a demand, and thereafter updates the schedules according to schedule change sets. The schedule change sets may improve a cost, availability, or number of customer transportation requests. For example, various schedules may update to accommodate new requests or other changes to vehicle demand. The change sets may include a change to a defined number of aircraft which is reviewable by a human operator or another component of a system.

Advantageously, generating iterative (e.g., cascaded) schedules for a transportation service comprising various fleets and customer types, as disclosed herein may improve an overall fleet utilization, lower a fleet cost, or increase an availability of transportation options for one or more customer types. In one aspect, inter-fleet booking may proceed according to a cascade. According to the cascade, a first fleet may be booked initially, followed by a second fleet. Such a cascade may be employed to reserve vehicles according to a demand, and customer assignments may thereafter be cascaded according to a customer type (e.g., guaranteed service customers may be assigned aircraft prior to non-guaranteed service customers). By aggregating various fleets, efficiencies or redundancies may be achieved, which may reduce fleet cost, increase fleet service, or maintain constant vehicle service type (e.g., avoid upgrading or downgrading of customers between vehicle classes). Further, the combination of fleets may reduce variations in vehicle availability as vehicle availability converges to a mean based on an increase in fleet size.

Although some examples herein are provided with respect to a flight service, general principles disclosed herein may be applied to other transportation services. Non-limiting examples may include rental cars, rental construction/utility vehicles (e.g., cranes), and hotels, among others.

In some embodiments, a computer-implemented method may comprise receiving, by a computer, a plurality of scheduling requests for each of a plurality of customer types; iteratively executing, by the computer, a scheduling algorithm configured to efficiently allocate aircraft of a plurality of aircraft fleets, including determining, by the computer, an itinerary for each of the aircraft of the plurality of aircraft fleets based on the scheduling requests, and determining, by the computer, an availability of one or more crews associated with the aircraft of the plurality of aircraft fleets, wherein the computer executes the scheduling algorithm for each updated scheduling request; generating, by the computer, a plurality of schedule change sets for presentation on a graphical user interface representing selected changes in a schedule based on an allocation of the aircraft and one or more crews from the scheduling algorithm, wherein generating the plurality of schedule change sets representing selected changes comprises: determining, by the computer, a viability of the plurality of schedule change sets; determining, by the computer, a cost associated with each of the viable schedule change sets according to a predetermined cost function; and selecting, by the computer, a schedule change set based on the cost thereof; responsive to receiving, by the computer, a confirmation approving the schedule change set, automatically generating and transmitting, by the computer, a message containing data representing the schedule change set to a plurality of schedule propagation nodes, so that each propagation node has immediate access to up-to-date schedule information of the aircraft of the plurality of aircraft fleets.

In some embodiments, a computer-implemented method may include receiving, by a computer, a plurality of scheduling requests for each of a plurality of customer types. The method can include iteratively executing, by the computer, a scheduling algorithm configured to allocate aircraft of a plurality of aircraft fleets, including determining, by the computer, an itinerary for each of the aircraft of the plurality of aircraft fleets based on the scheduling requests, and determining, by the computer, an availability of one or more crews associated with the aircraft of the plurality of aircraft fleets. The computer can execute the scheduling algorithm for each scheduling request. The method can include generating, by the computer, a plurality of schedule change sets for presentation on a graphical user interface representing selected changes in a schedule based on an allocation of the aircraft and one or more crews from the scheduling algorithm. Generating the plurality of schedule change sets representing selected changes can include determining, by the computer, a viability of the plurality of schedule change sets. Generating the plurality of schedule change sets representing selected changes can include determining, by the computer, a cost associated with each of the viable schedule change sets according to a predetermined cost function. Generating the plurality of schedule change sets representing selected changes can include selecting, by the computer, a schedule change set based on the cost thereof. The method can include automatically generating and transmitting, by the computer, a message containing data representing the schedule change set to a plurality of schedule propagation nodes, so that each propagation node has immediate access to up-to-date schedule information of the aircraft of the plurality of aircraft fleets. The automatic generation and transmission can be responsive to receiving, by the computer, a confirmation approving the schedule change set.

In some embodiments, a system, includes one or more processors coupled with memory. The system can receive a plurality of scheduling requests for each of a plurality of customer types. The system can iteratively execute, for the plurality of scheduling requests, a scheduling algorithm configured to allocate aircraft of a plurality of aircraft fleets. The execution can include a determination of an itinerary for each of the aircraft of the plurality of aircraft fleets based on the scheduling requests. The execution can include a determination of an availability of one or more crews associated with the aircraft of the plurality of aircraft fleets. The system can generate a plurality of schedule change sets for presentation on a graphical user interface representing selected changes in a schedule based on an allocation of the aircraft and one or more crews from the scheduling algorithm. Generating the plurality of schedule change sets representing selected changes can include a determination of a viability of the plurality of schedule change sets. Generating the plurality of schedule change sets representing selected changes can include a determination of a cost associated with each of the viable schedule change sets according to a predetermined cost function. Generating the plurality of schedule change sets representing selected changes can include a selection of a schedule change set based on the cost thereof. The system can approve the schedule change set responsive to receiving a confirmation. The system can automatically generate and transmit a message comprising data representing the schedule change set to a plurality of schedule propagation nodes.

In some embodiments a non-transitory computer-readable media includes instructions stored thereon that, when executed by one or more processors, cause the one or more processors to execute a method. The method includes receiving a plurality of scheduling requests for each of a plurality of customer types, the scheduling requests comprising first scheduling requests and updated scheduling requests. The method can include iteratively executing, for each of the plurality of scheduling requests, a scheduling algorithm configured to allocate aircraft of a plurality of aircraft fleets. The execution can include determining an itinerary for each of the aircraft of the plurality of aircraft fleets based on the scheduling requests. The execution can include determining an availability of one or more crews associated with the aircraft of the plurality of aircraft fleets. The method can include generating a plurality of schedule change sets for presentation on a graphical user interface representing selected changes in a schedule based on an allocation of the aircraft and one or more crews from the scheduling algorithm. Generating the plurality of schedule change sets representing selected changes can include determining a viability of the plurality of schedule change sets. Generating the plurality of schedule change sets representing selected changes can further include determining a cost associated with each of the viable schedule change sets according to a predetermined cost function. Generating the plurality of schedule change sets representing selected changes can further include selecting a schedule change set based on the cost thereof. The method can include automatically generating and transmitting, responsive to receiving a confirmation approving the schedule change set, a message comprising data representing the schedule change set to a plurality of schedule propagation nodes.

In some embodiments, a computer-implemented method includes receiving, by a computer, a plurality of scheduling requests corresponding to one or more schedule propagation nodes. The method can include iteratively executing by the computer, responsive to a receipt of one or more of the plurality of scheduling requests, a scheduling algorithm configured to allocate aircraft of a plurality of aircraft fleets, including determining, by the computer, an itinerary for each of the aircraft of the plurality of aircraft fleets based on the scheduling requests, and determining, by the computer, an availability of one or more crews associated with the aircraft of the plurality of aircraft fleets. The method can include generating, by the computer, a plurality of schedule change sets for presentation on a graphical user interface representing selected changes in a schedule based on an allocation of the aircraft and one or more crews from the scheduling algorithm, wherein the graphical user interface presents a plurality of user selectable control elements corresponding to a plurality of schedule changes of one or more of the plurality of schedule change sets. Generating the plurality of schedule change sets representing selected changes can include determining, by the computer, a viability of the plurality of schedule change sets. Generating the plurality of schedule change sets representing selected changes can include determining, by the computer, a cost associated with each of the viable schedule change sets according to a predetermined cost function. Generating the plurality of schedule change sets representing selected changes can include selecting, by the computer, a schedule change set based on the cost thereof. The method can include, responsive to receiving, by the computer, a selection of the user selectable control element approving the schedule change set, automatically generating and transmitting, by the computer, a message containing data representing the schedule change set to the plurality of schedule propagation nodes, so that each propagation node has immediate access to up-to-date schedule information of the aircraft of the plurality of aircraft fleets.

In some embodiments a system includes one or more processors coupled with memory. The system can be configured to receive a plurality of scheduling requests corresponding to one or more schedule propagation nodes. The system can be configured to iteratively execute, responsive to a receipt of one or more of the pluralities of scheduling requests, a scheduling algorithm configured to allocate aircraft of a plurality of aircraft fleets. The execution can include a determination of an itinerary for each of the aircraft of the plurality of aircraft fleets based on the scheduling requests. The execution can include a determination of an availability of one or more crews associated with the aircraft of the plurality of aircraft fleets. The system can be configured to generate a plurality of schedule change sets for presentation on a graphical user interface representing selected changes in a schedule based on an allocation of the aircraft and one or more crews from the scheduling algorithm, wherein the graphical user interface presents a plurality of user selectable control elements corresponding to a plurality of schedule changes of one or more of the plurality of schedule change sets. Generating the plurality of schedule change sets representing selected changes can include a determination of a viability of the plurality of schedule change sets. Generating the plurality of schedule change sets representing selected changes can include a determination of a cost associated with each of the viable schedule change sets according to a predetermined cost function. Generating the plurality of schedule change sets representing selected changes can include a selection of a schedule change set based on the cost thereof. The system can be configured to approve the schedule change set responsive to receiving a selection of the user selectable control element. The system can be configured to automatically generate and transmit a message comprising data representing the schedule change set to the plurality of schedule propagation nodes.

In some embodiments a non-transitory computer-readable media includes instructions stored thereon that, when executed by one or more processors, cause the one or more processors to execute a method. The method includes receiving a plurality of scheduling requests corresponding to one or more schedule propagation nodes, the scheduling requests comprising first scheduling requests and updated scheduling requests. The method includes iteratively executing, responsive to a receipt of one or more of the pluralities of scheduling requests, a scheduling algorithm configured to allocate aircraft of a plurality of aircraft fleets. The execution can include determining an itinerary for each of the aircraft of the plurality of aircraft fleets based on the scheduling requests. The execution can include determining an availability of one or more crews associated with the aircraft of the plurality of aircraft fleets. The method can include generating a plurality of schedule change sets for presentation on a graphical user interface representing selected changes in a schedule based on an allocation of the aircraft and one or more crews from the scheduling algorithm, wherein the graphical user interface presents a plurality of user selectable control elements corresponding to a plurality of schedule changes of one or more of the plurality of schedule change sets. Generating the plurality of schedule change sets representing selected changes includes determining a viability of the plurality of schedule change sets. Generating the plurality of schedule change sets can include determining a cost associated with each of the viable schedule change sets according to a predetermined cost function. Generating the plurality of schedule change sets can include selecting a schedule change set based on the cost thereof. The method can include automatically generating and transmitting, responsive to receiving a selection of the user selectable control element approving the schedule change set, a message comprising data representing the schedule change set to a plurality of schedule propagation nodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate an embodiment of the invention, and, together with the specification, explain the invention.

DETAILED DESCRIPTION

Figure 1:
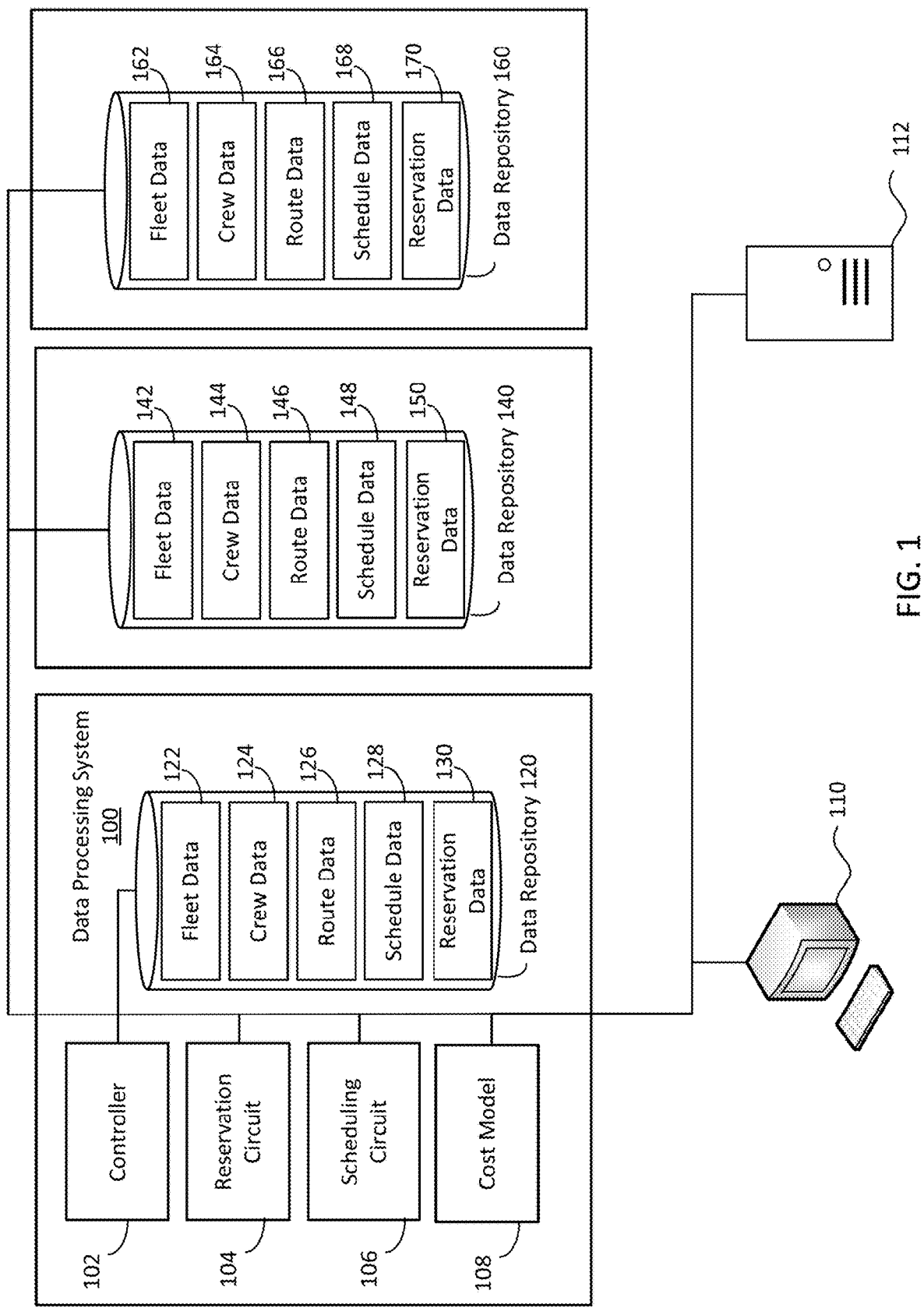
FIG. 1 illustrates a computer system for scheduling aircraft, in accordance with an embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIG. 1 illustrates a computer system 100 for scheduling transportation services, in accordance with an embodiment. For example, the transportation service may include vehicles (e.g., ground vehicles or aircraft), pilots, crew, maintenance parts or staff, and the like. The system 100 may include or interface with at least one controller 102, reservation circuit 104, scheduling circuit 106, cost model 108, user interface presented on a computing device 110, schedule propagation node 112, first data repository 120, second data repository 140, or third data repository 160. One or more components of or interfacing with the system 100 may include a processing unit or other logic device such as a programmable logic array engine or module configured to communicate with the data repository 120, 140, 160 or database. The controller 102, reservation circuit 104, scheduling circuit 106, cost model 108, user interface presented on the computing device 110, schedule propagation node 112, or data repositories 120 may be separate components, a single component, or include various shared components therebetween. Various components of the system may intercommunicate via a wired or wireless network 180. The network 180 may include computer networks such as the Internet, local, wide, metro, or other area networks, intranets, cellular networks, satellite networks, and other communication networks 180 such as Bluetooth, or data mobile telephone networks. The network 180 may be public or private.

Each data repository 120, 140, 160 may include one or more local or distributed databases, and may include a database management system. The data repository 120, 140, 160 may include computer data storage or memory and may store one or more of fleet data 122, crew data 124, route data 126, schedule data 128, or reservation data 130. The fleet data 122 may include a number of vehicles, number of seats per vehicle, vehicle characteristic (e.g., cruising speed, amenity, flight ceiling, etc.), flight cost, crew requirements, fuel use, or compatibility with a terminal. The fleet data 122 may further include commitment status for various vehicle fleets. For example, a vehicle fleet may include owned vehicles which may remain available indefinitely, term contracted vehicles, which may remain available for a predefined time (e.g., one year, three months, one week, or the like), or vehicles which may be available on a trip to trip basis, including already committed vehicles or vehicles available for a commitment.

The crew data 124 may include a location, type, availability, or work history of a crew or crewmember (e.g., a number of flight hours or working hours remaining in a period, such as a 24-hour period, a one-year period, or the like). The crew data 124 may include measured or predicted data. For example, a location of a crew or crewmember may be predicted or measured. For example, crew data 124 may include a predicted location and availability of a crew, which may thereafter be updated responsive to a schedule change (e.g., due to weather, efficiency improvement, or the like). The route data 126 may include a travel time, fuel use, terminal information (e.g., availability or cost of maintenance, catering, fueling or other resource of an origin, destination, or layover location). The schedule data 128 may include a previously generated schedule including an itinerary for one or more vehicles, pilots or other crewmembers, etc. The schedule data 128 may include a potential or implanted change set to a schedule. The reservation data 130 may include various information accessed by (e.g., received by) or generated by a reservation circuit 104. For example, reservation data may include a requested destination, origin, time, or customer type associated with a scheduling request. Each data repository 120, 140, 160 may include data for a vehicle fleet, a customer type or classification, region, business unit, or other subdivision of available information. Each data repository 120, 140, 160 may be collocated, separate, or independent and may contain overlapping or segregated data. The various data repositories 120, 140, 160 may store data according to a same or different format. The system 100 can harmonize data between the various data repositories to aggregate data of the various data repositories. According to various embodiments, the system 100 can include or access additional or fewer data repositories such as a fourth data repository, a fifth data repository, and so on.

The system 100 may include at least one controller 102. The controller 102 may include or interface with one or more processors and memory. The processor may be implemented as a specific purpose processor, an application specific integrated circuit (ASIC), one or more field programmable gate arrays (FPGAs), a group of processing components, or other suitable electronic processing components. The processors and memory may be implemented using one or more devices, such as devices in a client-server implementation. The memory may include one or more devices (e.g., random access memory (RAM), read-only memory (ROM), flash memory, hard disk storage) for storing data and computer code for completing and facilitating the various user or client processes, layers, and modules. The memory may be or include volatile memory or nonvolatile memory and may include database components, object code components, script components, or any other type of information structure for supporting the various activities and information structures of the inventive concepts disclosed herein. The memory may be communicably connected to the processor and include computer code or instruction circuits for executing one or more processes described herein. Such instructions may be stored on nonvolatile memory. The memory may include various circuits, software engines, and/or modules that cause the processor to execute the systems and methods described herein, such as to cause the communication or processing of data (e.g., data received from the data repositories 120, 140, 160).

The controller 102 may include or be coupled with communications electronics. The communications electronics may conduct wired and/or wireless communications via the network 180 or other communication link. For example, the communications electronics may include one or more wired (e.g., Ethernet, PCIe, or AXI) or wireless transceivers (e.g., a Wi-Fi transceiver, a Bluetooth transceiver, an NFC transceiver, or a cellular transceiver). The controller 102 may be in network communication or otherwise communicatively coupled with the reservation circuit 104, scheduling circuit 106, cost model 108, computing device 110, schedule propagation node 112, or data repositories 120, 140, 160. The controller 102 may cause one or more operations disclosed, such as by employing another element of the data processing system. For example, operations disclosed by other elements of the data processing system may be initiated, scheduled, or otherwise controller by the controller 102.

The system 100 may include at least one reservation circuit 104 designed, constructed, or operational to receive a scheduling request from a user. The scheduling request may include a requested day or time of day for a departure or arrival from an origin or to a destination, route, or the like. The scheduling request may include a vehicle type, or the reservation circuit 104 or other component of the system 100 may correlate a requestor identity (e.g., name, type, or unique identifier) to a user type. The reservation circuit 104 may correlate a requestor identity to a priority, vehicle type, or the like. For example, the reservation circuit 104 may determine that a user is subscribed to a service as a high priority user for a super mid-size jet. The reservation circuit 104 may provide the user with a selection from a predefined number of destinations, origins, departure times, or arrival times. For example, the reservation circuit 104 may convey a list of destinations or times for presentation to a user according to a user type. For example, the scheduling request may cause a selection time such as breadth of a time window, or a destination to be presented to a user according to a compatibility with a vehicle type, or a customer subscription option.

The reservation circuit 104 may convey schedule information to the user. For example, the reservation circuit 104 may convey a flight confirmation to the user. The flight information may include a confirmation including a variance from the requested information and may provide further information relevant to the flight. For example, the reservation circuit 104 may provide an identity (e.g., type, class, or tail number) of an aircraft, or provide a flight time, an arrival time, or other information to the user (e.g., directions to an airport or location thereof). In an implementation, the reservation circuit 104 may receive a request from a user to arrange transportation between Dallas and Chicago on Monday morning. The reservation circuit 104 may convey the time, destination, and origin to the scheduling circuit 106, whereby the scheduling circuit 106 may determine an aircraft, crew, departure time, or arrival time. The reservation circuit 104 receive said information from the scheduling circuit 106, and provide a time, aircraft identifier (e.g., model and tail number), flight time (e.g., 09:10), arrival time or range (e.g., 08:40-08:55), or any available crew information to the user (e.g., via the network 180).

The system 100 may include at least one scheduling circuit 106 designed, constructed, or operational to determine a schedule comprising an itinerary for at least one vehicles, crewmembers or crews, pilots, or the like. The scheduling circuit 106 may receive various scheduling requests from the reservation circuit 104, or a prediction of scheduling requests from a demand prediction circuit (not depicted). The scheduling circuit 106 may determine schedules iteratively. For example, the scheduling circuit 106 may determine a first schedule based on an available number of scheduling requests or a prediction thereof. The scheduling circuit 106 may generate the first schedule based on a subset of fleets, crews, scheduling requests, etc. For example, the scheduling circuit 106 may generate the first schedule based on available scheduling requests for a fleet or subset thereof which is reserved at a first time (e.g., the first schedule may generate a schedule for aircraft weeks in advance of travel). The first schedule may omit a crew, terminal services, or other components of a vehicle itinerary, or may generalize some aspects (e.g., may compare a number of available crewmembers to a number of required crewmembers without determining an assignment of individual crew members). For example, the scheduling circuit 106 may automatically determine components of a vehicle itinerary based on available information or an interval to a departure, or according to a run configuration received via the user interface presented on computing device 110. As used herein, a run configuration may include a set of parameters received by the scheduling circuit 106 or another system 100 component to generate or select a schedule.

The scheduling circuit 106 may update the schedule iteratively. For example, the scheduling circuit may update the schedule periodically based on a predefined time before a day of departure (e.g., weekly, daily, hourly, or continuously), or upon a receipt of updated information. For example, responsive to an update to a crew location or other crew data 124, 144, 164, or upon a receipt of a scheduling request. The scheduling request may include a single request from a single user, or a batched scheduling request, such as a daily update, hourly update, or an aggregation of a predefined number of requests, or a total number of requests received in a predetermined time. The scheduling circuit 106 may increase a granularity or detail of a schedule over time. For example, the scheduling circuit 106 may include a crew, a terminal location (e.g., gate, hanger, or the like), or any terminal services in a subsequent schedule. Such an increase in granularity may be automatic or responsive to a run configuration received from the user interface presented on computing device 110.

The scheduling circuit 106 may determine a schedule change set according to a number of impacted vehicles. For example, the scheduling circuit 106 may generate schedule changes for a limited number of vehicles within a fleet or between various fleets. For example, the scheduling circuit 106 may generate change sets for a maximum number of vehicles, which may, advantageously, ease a manual review of a schedule change set relative to schedule changes which may impact an unlimited number of vehicles. According to some embodiments, the change set sizes may be received as a part of a run configuration.

The scheduling circuit 106 may determine a viability of one or more schedules. For example, the scheduling circuit 106 may determine that a schedule that fails to adhere to crew rest requirements, overlapping use of a vehicle, or another blocking criteria. Blocking criteria may be predefined or selected according to an input received at the user interface on computing device 110. In some embodiments, a cost model 108 may cause the scheduling circuit 106 to prune various schedules. For example, the scheduling circuit 106 may prune high-cost schedules, and may retain a schedule or schedule change set based on a cost thereof (e.g., according to a comparison to a cost threshold). The scheduling circuit 106 may mutate schedules according to an algorithm. According to some embodiments, the scheduling circuit 106 may employ different algorithms according to various run configurations. For example, various run configuration may include weighting according to a desired outcome. For example, a run configuration may include a weighting to minimize overall cost, to maintain service according to a customer type (e.g., which may include a cost or weight for downgrading a customer from an expected vehicle type to another vehicle type and a same or different cost or weight for upgrading a customer from an expected vehicle type to another vehicle type). A run configuration may include a weighting to avoid changes, or to minimize a size of a change set. Each run configuration may employ a same or different model.

The algorithm employed by the scheduling circuit 106 may include a deterministic or non-deterministic model including a genetic algorithm, integer programming, linear programming, optimal control solution, Bayesian optimization, other artificial intelligence models, or the like. According to some embodiments, various weights of the scheduling circuit 106 may be employed by the cost model 108. For example, a weighting of a factor of the schedule circuit may be supplemented or replaced by a cost function which may increase or decrease a priority of a schedule change set relative to another schedule change set or another threshold. In one embodiment, the scheduling circuit executes a genetic algorithm that can randomly create schedules, use guided mutations, and improve a schedule with each iteration. The best solutions may be retained for the next generation, and the poorest performing solutions may be discarded and replaced in the next generation. As a result, the scheduling circuit can iteratively execute the genetic algorithm to optimize the schedule. A fitness function may prevent a solution if a certain rule is violated by that solution. The scheduling circuit 106 may also execute the algorithm automatically. It may run continuously, be triggered by an event, such as an input of new data (e.g., maintenance, new request, weather information, crew information), or may automatically execute upon completion of the algorithm.

The system 100 may include at least one cost model 108 designed, constructed, or operational to determine a cost associated with a schedule (e.g., a sum of costs associated with various itineraries or respective vehicles). The cost model 108 may determine a cost according to various criteria. For example, the cost model 108 may determine a utilization rate of a schedule, based on an aircraft utilization. The aircraft utilization may compare a portion or ratio of the routes for which aircraft are occupied vs. unoccupied. For example, an 80 percent utilization rate may indicate that a vehicle is occupied for 80 percent of routes, hours, miles, or another metric, or may indicate the 80 percent of seats, weight capacity or another measure of capacity is occupied for a schedule. According to some embodiments, a cost model 108 may determine a cost based on fuel use (e.g., a monetary cost, number of tons of $CO_2$ emitted), crew time, airport of other terminal interchange fees, or the like. According to some embodiments, a cost model can include various cost factors to bias an outcome, such as a bias towards reducing a number of unfulfilled scheduling requests, a delay of a user, a change to an existing schedule, or other costs or weights which are further described with regard to, for example, FIG. 2.

A maximum number of vehicles may be defined for a change set according to a run configuration received via the user interface presented on computing device 110, otherwise determined by the cost model 108. The cost model 108 may determine a total cost benefit from schedule changes according to various change set sizes. For example, the cost model 108 may determine that a relative cost improvement of 20% is realized by establishing a maximum change set size of 5 vehicles rather than 4 vehicles, compare the 20% to a threshold, and provide change set data for 5 vehicles (e.g., based on a threshold less than or equal to 20%). The cost model 108 may determine that a relative cost improvement of 2% is realized by establishing a maximum change set size of 6 vehicles rather than 5 vehicles, compare the 2% to a threshold, and provide change set data for 5 vehicles (e.g., based on a threshold greater than or equal to 2%). Thus, a schedule update may be provided as a series of atomic change sets, such that some change sets may be implemented independent of other change sets which may ease review of proposed changes, such as by a human operator or another component of the system 100.

The system 100 may include at least one user interface designed, constructed, or operational to convey information between a user and other components of the system 100. For example, the user interface presented on computing device 110 may include or interface with a graphical user interface (GUI) to present information to the user and receive information from the user. Information received from the user may include a run configuration. For example, the user interface may receive run configuration elements such as a time to schedule, a list of elements to schedule or omit (e.g., according to a vehicle type, fleet type, customer type, crew, terminal services, or the like). For example, a user interface may suggest a run configuration to schedule vehicles weeks or days in advance and increase a level of detail such as an inclusion of crew, an inclusion of additional customer types, fleets or the like at a time closer to a day of a flight. The computing device 110 may be configured to receive information from the data processing system 100 and display it on a user interface for interaction with a user. In one configuration, the controller 102 may present data to be inserted into an application executing on computing device 110, whereby a user interface displays options for configurations, results, and schedules.

The system 100 may include at least one schedule propagation node 112 designed, constructed, or operational to provide a schedule to a vehicle (e.g., a pilot associated therewith), a regional traffic controller, or another user. For example, the schedule propagation node 112 may include a device in network communication with the system 100 such that schedule updates may be propagated to the schedule propagation node. The schedule propagation node 112 may receive schedule updates in a push or pull configuration (e.g., responsive to a user entry, a polling frequency, a push notification or the like). According to some embodiments, the schedule propagation node 112 may receive (or display) a schedule for one or more fleets, or an itinerary associated with one or more vehicle. For example, a schedule propagation node 112 for a vehicle may receive an itinerary for that vehicle, a schedule propagation node 112 for a terminal, such as an airport may receive a schedule for various aircraft associated with the airport, or a schedule propagation node 112 for a regional control center may receive a schedule comprising the various aircraft associated with the region.

Figure 2:
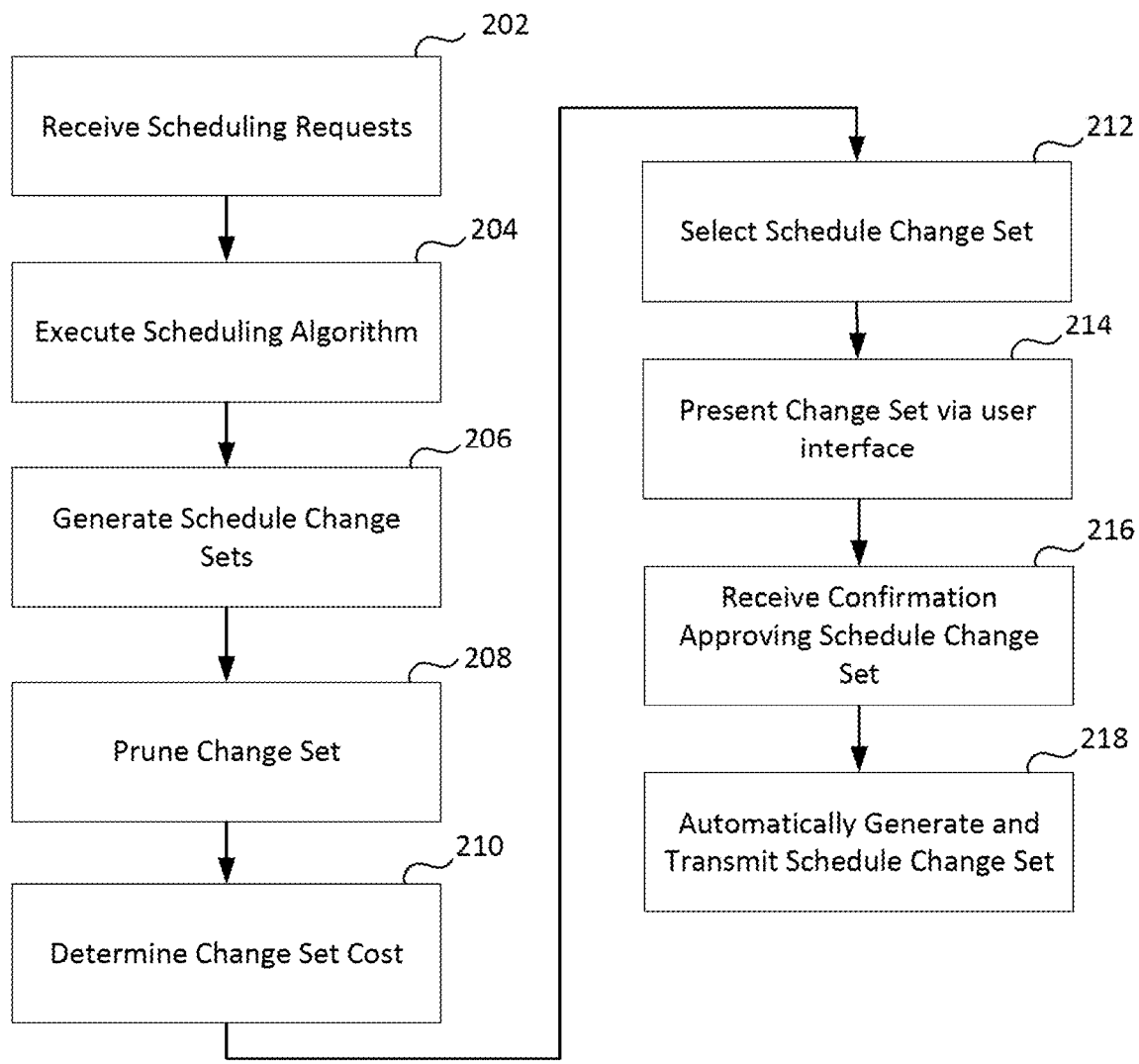
FIG. 2 illustrates a method of scheduling aircraft, in accordance with an embodiment.

FIG. 2 illustrates a method 200 of scheduling aircraft, in accordance with an embodiment. The method 200 may be performed by one or more computers of, interfacing with, or otherwise employing a system 100 (e.g., including the controller 102 of the system 100). In some embodiments, the method 200 includes additional, fewer, or different steps than shown in FIG. 2. In some embodiments, some steps of the method 200 are performed in a different sequence than shown in FIG. 2. For example, operations can be repeated to iteratively schedule various aircraft responsive to updated schedule requests, crew information, or the like.

In one aspect, based on the operations performed by the computer in the operations 202-218, the computer may determine an itinerary for various vehicles (e.g., aircraft). For example, if any of the operations 202-218 are not satisfied or a further scheduling request is received, the computer may repeat one or more steps to update a schedule (e.g., one or more change sets) and propagate the changes to one or more schedule propagations nodes 112. As another example, if all of the operations of 202-218 satisfy schedule viability rules, costs, etc., the computer may determine that a current schedule should be employed. For example, the computer may omit an update to one or more schedule propagations nodes 112 or may provide an updated run time to schedule propagations nodes 112 confirming or repeating a previously provided schedule.

At operation 202, a computer receives a plurality of scheduling requests. For example, the scheduling requests can be received from a plurality of customer types. The customer types can each be associated with a respective vehicle fleet or other service level. For example, customer types may refer to a priority for the customer, a relevant vehicle type for the customer or the like.

Figure 3:
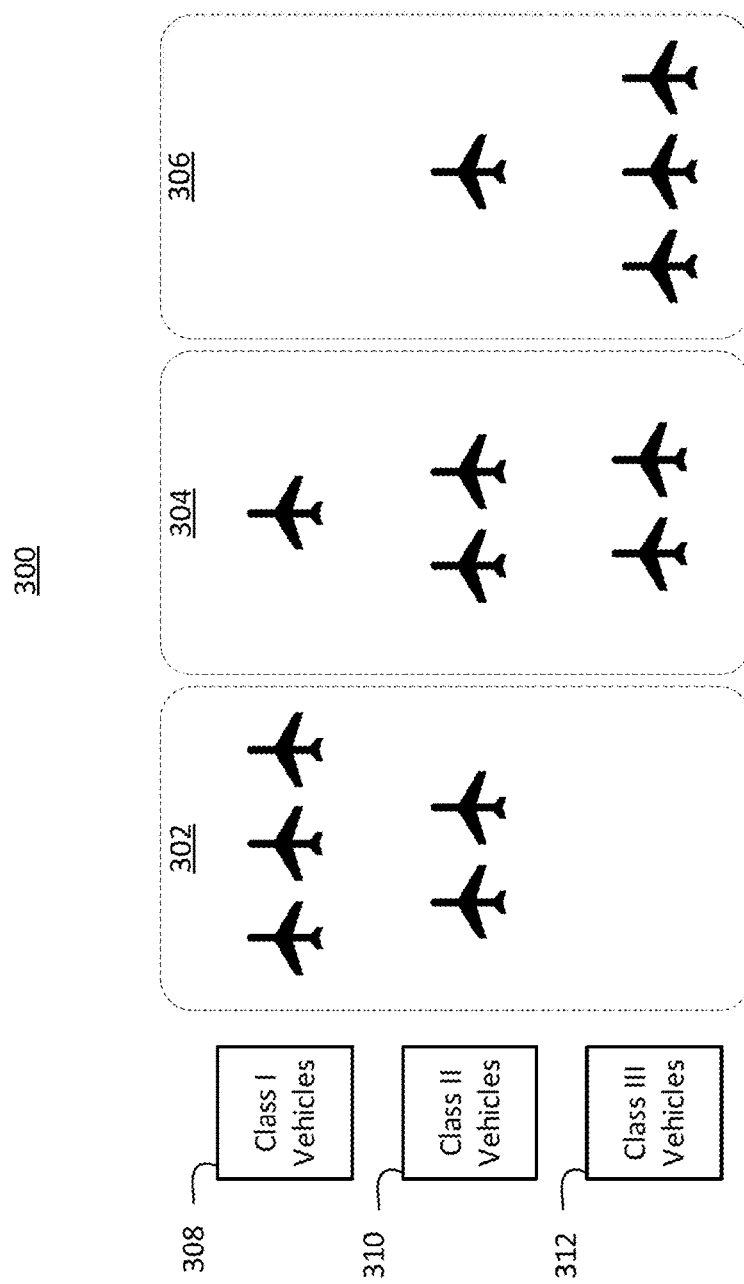
FIG. 3 illustrates various aircraft fleets and types, in accordance with an embodiment.

FIG. 3 illustrates various aircraft fleets and types, in accordance with an embodiment. For example, FIG. 3 depicts each vehicle (e.g., aircraft) of a first fleet 302, a second fleet 304, and a third fleet 306. Each fleet may include one or more classes of aircraft which may overlap between the fleets. For example, each aircraft may include light jets, mid-size jets, or super-mid-size jets. Some fleets may include additional or fewer aircraft types. One skilled in the art will understand that various fleets can include various vehicle types, which may be compatible with the systems and methods disclosed herein. For example, a fleet can include one or more of an aircraft, bus, car, or other vehicles. Each fleet includes various vehicles which can be identified according to a unique vehicle identifier (e.g., a tail number, VIN, or the like). Various vehicles of a fleet can be classified according to a vehicle type. For example, each fleet can include vehicles of various classes such as the depicted Class I vehicles 308, Class II vehicles 310, or class III vehicles 312. A vehicle class may refer to a number of seats, weight capacity, speed, amenity, or other characteristic thereof. Each scheduling request can include or correspond to a fleet, or vehicle class. For example, the scheduling request may include a fleet or vehicle class specified by the user, or a controller may associate the scheduling request with a fleet, particular vehicle, or class according to a user identifier, origin, destination, or the like.

At operation 204, a computer executes a scheduling algorithm to efficiently allocate vehicles (e.g., aircraft) of the plurality of vehicle fleets. For example, the scheduling algorithm can determine an itinerary for each of the vehicles (e.g., aircraft) of the various fleets based on the scheduling requests. Each itinerary can include one or more terminals (e.g., airports) including arrival times, departure times, travel times, and the like. Each itinerary can include an arrival time of a vehicle prior to a departure time. For example, the computer may schedule a vehicle to arrive at least one hour prior to a departure, or to arrive such that the aircraft may be available at least one hour prior to a departure (e.g., complete any servicing such as refueling, catering, or the like). An itinerary may further include various maintenance operations including times, maintenance staff, locations (e.g., hangers) or the like. For example, the computer may generate or receive various maintenance times, schedules, or locations such that the itinerary for each vehicle can include the maintenance. The computer may employ various algorithms of the scheduling circuit to determine a schedule comprising the various itineraries, as is further described with respect to the scheduling circuit 106 of FIG. 1.

The computer may execute the scheduling algorithm iteratively. For example, the computer may determine a first set of itineraries for a subset of fleets or vehicles or vehicles thereof. For example, the computer can determine a first schedule including itineraries for a first fleet of vehicles (e.g., a fleet of vehicles which includes temporary operational agreements, or which may be otherwise flexed to include additional or fewer vehicles according to a demand, where said demand may be determined according to the execution of the scheduling algorithm). A subsequent execution of the scheduling algorithm may include the first fleet and a second fleet (e.g., a fleet which may be of predefined size such as a fleet which is owned, leased, or otherwise contracted for operation during a scheduling horizon). The subsequent execution of the scheduling algorithm may incorporate a scheduling request received subsequent to the first execution. In some embodiments, the scheduling circuit can receive a scheduling request after an initiation of an execution of a scheduling algorithm and may include the scheduling request in the schedule. For example, the scheduling circuit can restart an execution of the scheduling algorithm or incorporate the additional scheduling requests in a schedule during execution of the scheduling algorithm. In some implementations, the first fleet may be associated with non-guaranteed service customers, such that an assignment of the first fleet can thereafter be substituted for another customer type during a subsequent execution of the scheduling algorithm. The subsequent execution of the scheduling algorithm can include any number of executions. In one configuration, the scheduling algorithm is executed upon each input of new data. In another configuration, the scheduling algorithm is executed again upon each completed execution of the scheduling algorithm. In another configuration, the scheduling algorithm is executed a number of times until a certain threshold or confidence level is satisfied.

The computer can determine an availability of one or more crews associated with the vehicles (e.g., aircraft) of the various fleets. For example, the computer may determine an itinerary for one or more vehicle in a first run. The itineraries may include a location and movement of the vehicle and may omit a crewing of the vehicle or may omit crewing details. For example, an itinerary may include no crew information, or may include limited crew information such as a crew count, a pilot, or the like. A subsequent itinerary may include new or additional crew information. For example, a subsequent execution of the scheduling algorithm may include crew information based on a crew location which was unavailable or estimated with lower confidence at a time of the first execution. The various executions of the scheduling algorithm can cascade to include additional users, such as according to a receipt of the scheduling request, or a priority of the user.

The computer can update the scheduling algorithm for each updated scheduling request, wherein a scheduling request may refer to a scheduling request received from a user, or a batch of scheduling requests received from one or more users (e.g., according to a time period, an update to a vehicle location, vehicle status, number of scheduling requests, or the like). Likewise, the computer can update the algorithm according to a time to departure or a selection received via a user interface.

At operation 206, the computer generates a plurality of schedule change sets. Each schedule change sets can be generated independently or based on a disaggregation of a schedule (e.g., the change sets for a lesser number of vehicles can be disaggregated from a schedule change affecting a greater number of vehicles, or the scheduling circuit 106 can generate various change sets independently). Various change sets may be incompatible (e.g., two change sets may be mutually blocking such as based on a same use of a vehicle or crew at a same time in different places). By disaggregating an overall schedule change into various change sets, each change set can be independently evaluated such that a human operator can review or approve a change set, or a rule violation of a change set (as is discussed henceforth, with regard to operation 208), may not affect other change sets of the schedule change. A change set can include a proposed additional of one or more vehicles for a time period, based on at least one of an input of the scheduling circuit 106 or cost model 108.

At operation 208, the computer can determine a viability of the plurality of schedule changes and may prune any non-confirming change sets. For example, the various itineraries defined according to one or more change sets can be compared to one or more rule sets to determine a viability of the schedule change. A rule set can include physical or temporal constraints applied within or between change sets. Such a rule set can include a minimum transit time between locations according to a speed of a vehicle. Further, such a rule set may include a location or travel time of a crew which may be different from an itinerary of a fleet vehicle, avoidance of overlapping trips, and the like. A rule set can include a regulatory rule. For example, a rule set can include a minimum number of hours of rest or a maximum hours of operation for a vehicle operator such as a pilot or other crewmember of an aircraft, a show time of a vehicle before a departure (e.g., one hour), or a maintenance interval. A ruleset may incorporate an operational requirement. For example, an operation requirement can include a time or location for a terminal service (e.g., catering, clearing, or the like). Further, an operational requirement can include a number of customers transported according to a schedule or a change set. According to various embodiments, operational requirements can be substituted with weights or costs (and vice versa). For example, a reduction in a catering time from 18 minutes to 15 minutes can be associated with a cost or weight, at operation 210, rather than incident to determining a viability of an itinerary, change set, or schedule (e.g., according to a run criterion received via the user interface). Thus, the computer can determine an impact of a requirement to a cost or can determine if a condition can be accommodated.

At operation 210, the computer can determine a cost associated with each of the viable schedule changes according to a predetermined cost function. For example, the cost function can include a cost determined by the cost model 108. A cost function can include a utilization rate of a schedule or portion thereof (e.g., a net change to utilization rate of a schedule change set). A cost function can include a monetary cost of an itinerary of one or more vehicle, which may include a depreciation cost, fuel cost, crew cost, service cost, or the like. The cost function can include a number of scheduling requests which are not fulfilled (e.g., based on a total count, a total number of flight hours, a customer type (e.g., cascading according to a priority order based on customer types), estimated cost to provide alternate transportation). For example, higher priority customers can be associated with a first weight or cost, and lower priority customers can be associated with a second weight or cost.

Figure 4:
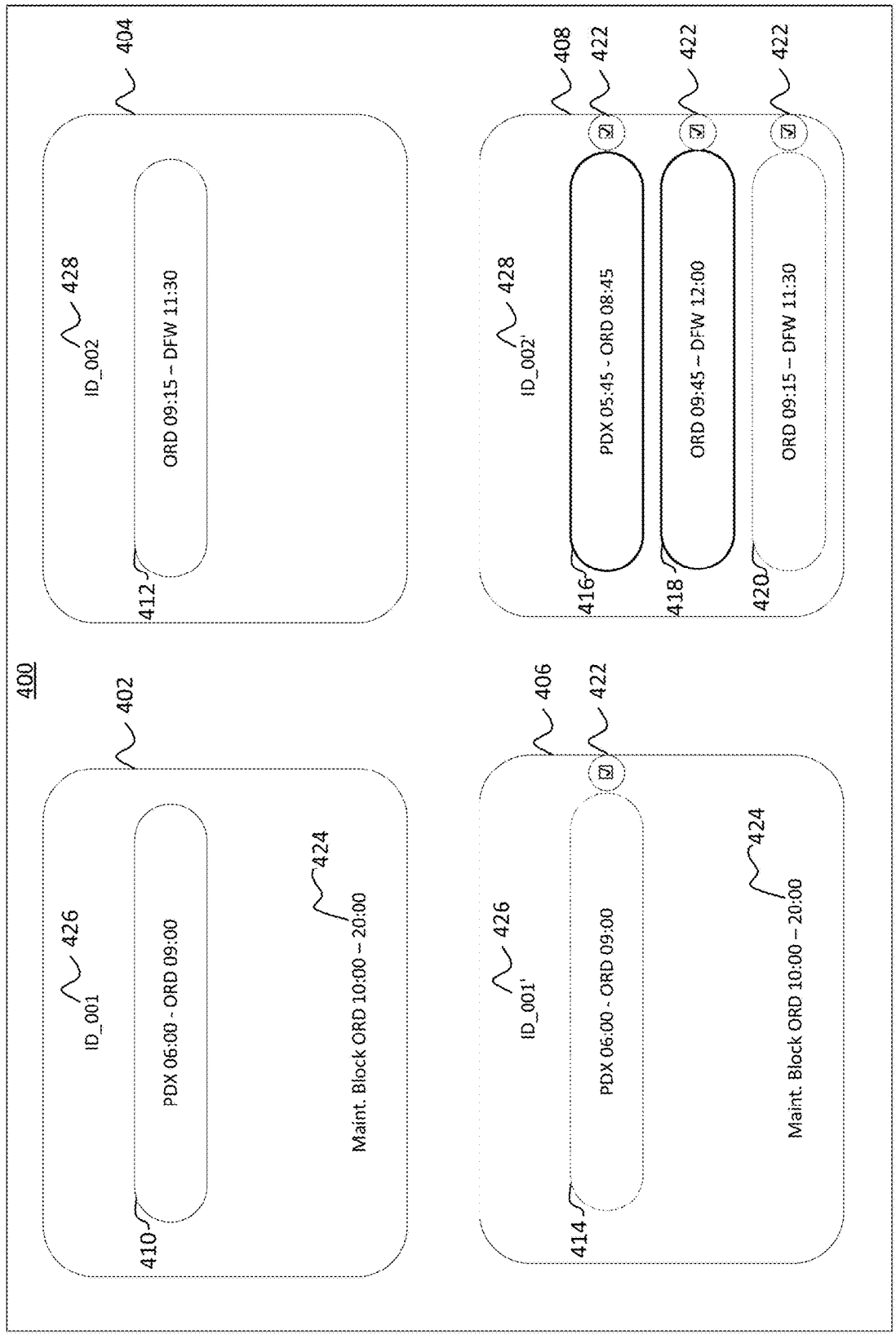
FIG. 4 illustrates a graphical user interface, in accordance with an embodiment.

The cost function can further include a change of a flight time to one or more vehicle itineraries. For example, FIG. 4 depicts a GUI 400 including a first itinerary for a second aircraft 404. The GUI 400 further depicts a change set comprising an updated itinerary for the second aircraft 408. The updated itinerary 408 depicts an adjustment of a time of the original ORD-DFW flight 420 to an adjusted ORD-DFW flight 418, 30 minutes later). Such a flight time adjustment can be associated with a cost such that the presentation of the flight to the user may depended upon a magnitude of such an adjustment. For example, the cost can be a presumed monetary cost due to schedule disruption, or consumer satisfaction, or may be a non-monetary cost of the cost model 108.

At operation 212, the computer can select a schedule change set based on the cost thereof. For example, a cost of a schedule change can be compared to a threshold or another schedule change. The threshold can be received from the user interface, predefined, or variable according to a complexity of a schedule change (e.g., the cost model 108 may discriminate between a number of aircraft affected by a change set such that smaller change sets are preferentially selected). For example, the GUI 400 of FIG. 4, which depicts a change set for two aircraft can be associated with a lower cost than another change set of additional aircraft, even where a utility or monetary cost model 108 may indicate a preference for the larger change set.

At operation 214, the computer can cause the schedule change set to be presented to a user. For example, the computer can include a user interface comprising a GUI (e.g., the GUI 400 of FIG. 4), or convey the schedule change thereto. For example, the computer can convey encoded information for presentation to a GUI. The encoded information may include various indications of a change set. The encoded information includes at least a new schedule, or iterative changes relative to a previous schedule. The encoded information can further include previous schedule information such that the GUI can display a change to the schedule information. The encoded information may further include a cost associated with the change set.

For example, the GUI 400 of FIG. 4 depicts a change set of two aircraft. An existing itinerary of a first aircraft 402 includes an original PDX-ORD flight 410, and a maintenance block 424 at ORD. A proposed change set includes a removal of the PDX-ORD flight 414, and the maintenance block 424. An existing itinerary of a second aircraft 404 includes an original ORD-DFW flight 412. The change set itinerary of the second aircraft 408 includes a modified instance of the PDX-ORD flight 416, relative to the flight originally scheduled on the first aircraft 410, and a modified ORD-DFW flight 418. The GUI 400 further includes a control element 422 which is common to the change set configured to receive a confirmation of the change set from a user of the GUI 400. In some embodiments, various change sets can be presented simultaneously, and each control element 422 can include an indication of association with a change set (e.g., a unique color, identifier, row, or the like). According to some embodiments, the user can select a view which alternates between various changes sets, and depicts relationships therebetween (e.g., depict a change set which may block another change set). According to some embodiments, a control element 422 can include options to affirm or reject the change set (e.g., upon a selection of the control element 422 or based on a portion of a control element selected). Further, a GUI 400 may include a cost estimate of the change set which may include a monetary cost, a number of scheduling requests which are not fulfilled, or another cost measure as disclosed herein.

At operation 216, the computer can receive a confirmation approving the schedule change set. For example, the confirmation can be received from a user manipulating a control element 422. The computer can record a time, user identity (e.g., authentication), other indication of user approval, disapproval, or a failure to take an action.

At operation 218, the computer can automatically generate and transmit a message containing data including or otherwise representing the schedule change set to a plurality of schedule propagation nodes 112. Thus, each schedule propagation node 112 can receive immediate access to up-to-date schedule information for various vehicles of various vehicle fleets. The schedule propagation nodes 112 can each receive a same broadcast message, or the computer can generate individual methods according to a type of each schedule propagation node 112. For example, a regional broadcast node can receive change sets relevant to a region, or a vehicle can receive an update to the itinerary of the vehicle.

FIG. 4 illustrates a graphical user interface (GUI 400), in accordance with an embodiment. The GUI 400 depicts an itinerary for a first aircraft 402, the first aircraft having a first identifier 426. The first identifier 426 can include a fleet number, VIN, tail number, or other indication of aircraft identity. According to some embodiments the first identifier 426 (or another identifier) can include or reference an aircraft class, type, model, or other identifying information. The itinerary depicts an original PDX-ORD flight 410, and a maintenance block 424. The GUI 400 further depicts an itinerary for a second aircraft 404, the second aircraft having a second identifier 428. The itinerary depicts an original ORD-DFW flight 412.

The GUI 400 depicts a change set comprising an updated itinerary for the first aircraft 406 and an updated itinerary for the second aircraft 408. For example, the change set includes a removal of the PDX-ORD flight 414 for the first aircraft, an addition of a PDX-ORD flight 414 for the second aircraft, and an updated ORD-DFW flight 418 replacing a previously scheduled ORD-DFW flight 420 for the second aircraft. The updated itinerary can display flights schedule for removal according to a different prominence than flights scheduled for addition, such that a user can receive an indication of one or more flights which are removed, added, adjusted, or so forth. The GUI 400 can present one or more change sets according to a different color, screen, display, or so forth. Thus, a user of the GUI 400 can discriminate between separately selectable change sets. For example, a first change set can include inter-dependencies between aircraft, crews, or facilities such that an adoption of one portion of the change set violates a rule unless a second portion of the change set is also adopted. Separate change sets may be adopted independently, such as by accepting a first change set and rejecting a second change set.

The GUI 400 includes control elements 422 configured to receive an indication from a user as discussed with regard to operation 214 of FIG. 2. That is, the user can select a first control element 422 which is linked to one or more changes of a change set. The GUI 400 can update selections responsive to a selection of various control elements 422 of a change set responsive to the linkage therebetween. Thus, upon a selection of one control element 422, the GUI 400 can depict a change to multiple aircraft, crews, maintenance windows, etc., which can be executed as a set, without a violation of one or more rules.

The GUI 400 can include a selector configured to alternate between a presentation of various change sets. For example, the GUI 400 can present a plurality of changes sets on the screen which can be separately selectable, or present a single change set which include linkages such that a selection or deselection of the control element 422 applies to all or a portion of presented changes. Upon selector actuation (e.g., a button, drop down menu, 'next' control element 422, or so forth), the GUI 400 can present one or more different changes sets. For example, the GUI 400 can select a first change set for presentation based on an absolute cost threshold, or a relative cost threshold (e.g., relative to other changes sets). However, a user of the interface can decline to implement the change set, or view further change sets prior to their implementation. That is, a user can select for implementation (e.g., propagation to the various propagation nodes 112), a change set which does not have a lowest cost based on, for example, data which is not ingested into the cost model 108.

In some embodiments, the various changes sets can be ordered or presented on one or more screens according to a cost thereof, such as by presentation of a lowest cost set or n number of lowest cost sets on a first screen, with a first prominence, etc. The GUI 400 can present a cost associated with the selection of the change set. The selection of the control element 422, in the GUI 400, can cause a computing device in network communication therewith to propagate the selected change to multiple scheduling propagation nodes to realize the change. For example, upon a further user selection to confirm the application of the change set, the computing device can propagate the changes thereof.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, function, procedure, subroutine, subprogram, or the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that is accessible by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. "Disk" and "disc," as used herein, include compact disc (CD), laser disc, optical disc, digital versatile disc (DVD), floppy disk, and Blu-ray disc formats, wherein "disks" reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a computer, a plurality of scheduling requests corresponding to one or more schedule propagation nodes;
iteratively executing by the computer, responsive to a receipt of one or more of the plurality of scheduling requests, a scheduling algorithm configured to allocate aircraft of a plurality of aircraft fleets, including determining, by the computer, an itinerary for each of the aircraft of the plurality of aircraft fleets based on the scheduling requests, and determining, by the computer, an availability of one or more crews associated with the aircraft of the plurality of aircraft fleets,
generating, by the computer, a plurality of schedule change sets for presentation on a graphical user interface representing selected changes in a schedule based on an allocation of the aircraft and one or more crews from the scheduling algorithm, wherein the graphical user interface presents a plurality of user selectable control elements corresponding to a plurality of schedule changes of one or more of the plurality of schedule change sets, and generating the plurality of schedule change sets representing selected changes comprises:
determining, by the computer, a viability of the plurality of schedule change sets;
determining, by the computer, a cost associated with each of the viable schedule change sets according to a predetermined cost function; and
selecting, by the computer, a schedule change set based on the cost thereof; and
responsive to receiving, by the computer, a selection of the user selectable control element approving the schedule change set, automatically generating and transmitting, by the computer, a message containing data representing the schedule change set to the plurality of schedule propagation nodes, so that each propagation node has immediate access to up-to-date schedule information of the aircraft of the plurality of aircraft fleets.

2. The method of claim 1, wherein the cost function comprises a ratio of revenue hours to total flight hours.

3. The method of claim 1, wherein the cost function comprises a quantity of vehicles of the schedule change set.

4. The method of claim 1, wherein generating the schedule change set comprises generating a request to add a vehicle to a vehicle fleet for a time duration.

5. The method of claim 1, wherein the cost function ingests, for the aircraft of the plurality of aircraft fleets, a plurality of vehicle classes and a plurality of vehicle commitment statuses.

6. The method of claim 1, wherein the plurality of scheduling requests comprise:
a first portion of scheduling requests at a first priority associated with a first customer type; and a second portion of scheduling requests at a second priority associated with a second customer type, the second priority lesser than the first priority.

7. The method of claim 1, wherein presenting the schedule change set comprises presenting the cost associated with the schedule change set.

8. The method of claim 1, further comprising:
comparing the cost to a threshold, wherein the presentation of the schedule change set is responsive to the cost exceeding the threshold.

9. The method of claim 1, further comprising:
generating, automatically, responsive to a receipt of the updated scheduling request, the plurality of schedule change sets based on:
an updated scheduling request of the plurality of scheduling requests, received subsequent to other of the scheduling requests of the plurality of the scheduling requests; and
the availability of the one or more crews.

10. The method of claim 1, further comprising:
presenting the schedule change set on the graphical user interface, the presentation depicting the schedule change set for a plurality of vehicles, along with a control element common to each vehicle associated with the schedule change set such that a selection of the control element accepts the schedule change set for the plurality of vehicles.

11. A system, comprising one or more processors coupled with memory, the system configured to:
receive a plurality of scheduling requests corresponding to one or more schedule propagation nodes;
iteratively execute, responsive to a receipt of one or more of the plurality of scheduling requests, a scheduling algorithm configured to allocate aircraft of a plurality of aircraft fleets, the execution comprising:
a determination of an itinerary for each of the aircraft of the plurality of aircraft fleets based on the scheduling requests; and
a determination of an availability of one or more crews associated with the aircraft of the plurality of aircraft fleets;
generate a plurality of schedule change sets for presentation on a graphical user interface representing selected changes in a schedule based on an allocation of the aircraft and one or more crews from the scheduling algorithm, wherein the graphical user interface presents a plurality of user selectable control elements corresponding to a plurality of schedule changes of one or more of the plurality of schedule change sets, and generating the plurality of schedule change sets representing selected changes comprises:
a determination of a viability of the plurality of schedule change sets;
a determination of a cost associated with each of the viable schedule change sets according to a predetermined cost function; and
a selection of a schedule change set based on the cost thereof;
approve the schedule change set responsive to receiving a selection of the user selectable control element; and
automatically generate and transmit a message comprising data representing the schedule change set to the plurality of schedule propagation nodes.

12. The system of claim 11, wherein the cost function comprises a ratio of revenue hours to total flight hours.

13. The system of claim 12, wherein the cost function comprises a quantity of vehicles of the schedule change set.

14. The system of claim 11, wherein the generation of the schedule change set comprises a generation of a request to add a vehicle to a vehicle fleet for a time duration.

15. The system of claim 11, wherein the aircraft of the plurality of aircraft fleets comprise a plurality of vehicle classes and a plurality of vehicle commitment statuses.

16. The system of claim 11, wherein the plurality of scheduling requests comprise:
a first portion of scheduling requests at a first priority corresponding to a first customer type; and
a second portion of scheduling requests at a second priority corresponding to a second customer type, the second priority lesser than the first priority.

17. A non-transitory computer-readable media comprising instructions stored thereon that, when executed by one or more processors, cause the one or more processors to execute a method, the method comprising:
receiving a plurality of scheduling requests corresponding to one or more schedule propagation nodes, the scheduling requests comprising first scheduling requests and updated scheduling requests;
iteratively executing, responsive to a receipt of one or more of the plurality of scheduling requests, a scheduling algorithm configured to allocate aircraft of a plurality of aircraft fleets, the execution comprising:
determining an itinerary for each of the aircraft of the plurality of aircraft fleets based on the scheduling requests; and
determining an availability of one or more crews associated with the aircraft of the plurality of aircraft fleets,
generating a plurality of schedule change sets for presentation on a graphical user interface representing selected changes in a schedule based on an allocation of the aircraft and one or more crews from the scheduling algorithm, wherein the graphical user interface presents a plurality of user selectable control elements corresponding to a plurality of schedule changes of one or more of the plurality of schedule change sets, and generating the plurality of schedule change sets representing selected changes comprises:
determining a viability of the plurality of schedule change sets;
determining a cost associated with each of the viable schedule change sets according to a predetermined cost function; and
selecting a schedule change set based on the cost thereof, and
automatically generating and transmitting, responsive to receiving a selection of the user selectable control element approving the schedule change set, a message comprising data representing the schedule change set to a plurality of schedule propagation nodes.

18. The computer-readable media of claim 17, wherein the cost function comprises a ratio of revenue hours to total flight hours.

19. The computer-readable media of claim 17, wherein generating the schedule change set comprises generating a request to add a vehicle to a vehicle fleet for a time duration.

20. The computer-readable media of claim 17, wherein the plurality of scheduling requests comprises:
a first portion of scheduling requests at a first priority associated with a first customer type; and
a second portion of scheduling requests at a second priority associated with a second customer type, the second priority lesser than the first priority.

* * * * *